United States Patent
Kielstra et al.

(10) Patent No.: US 8,312,439 B2
(45) Date of Patent: *Nov. 13, 2012

(54) INLINING NATIVE FUNCTIONS INTO COMPILED JAVA CODE

(75) Inventors: Allan Henry Kielstra, Ajax (CA); Levon Sassoon Stepanian, Toronto (CA); Kevin Alexander Stoodley, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 352 days.

This patent is subject to a terminal disclaimer.

(21) Appl. No.: 12/418,989

(22) Filed: Apr. 6, 2009

(65) Prior Publication Data

US 2009/0193404 A1    Jul. 30, 2009

Related U.S. Application Data

(63) Continuation of application No. 11/062,293, filed on Feb. 18, 2005, now Pat. No. 7,530,059.

(51) Int. Cl.
*G06F 9/45* (2006.01)
(52) U.S. Cl. .................... 717/148; 717/151
(58) Field of Classification Search .................. None
See application file for complete search history.

(56) References Cited

U.S. PATENT DOCUMENTS

| | | | |
|---|---|---|---|
| 6,066,181 A | 5/2000 | DeMaster | |
| 6,282,702 B1 | 8/2001 | Ungar | |
| 6,314,445 B1 | 11/2001 | Poole | |
| 6,317,796 B1 * | 11/2001 | Bak et al. | 719/315 |
| 6,327,702 B1 * | 12/2001 | Sauntry et al. | 717/118 |
| 6,467,079 B1 | 10/2002 | Ettritch et al. | |
| 6,971,091 B1 * | 11/2005 | Arnold et al. | 717/145 |
| 7,089,566 B1 | 8/2006 | Johnson | |
| 7,171,655 B2 | 1/2007 | Gordon et al. | |
| 7,346,897 B2 | 3/2008 | Vargas | |
| 7,552,428 B2 | 6/2009 | Stoodley et al. | |
| 7,840,951 B1 * | 11/2010 | Wright et al. | 717/152 |
| 2002/0104076 A1 | 8/2002 | Shaylor | |
| 2004/0250240 A1 | 12/2004 | Stoodley et al. | |
| 2006/0190934 A1 | 8/2006 | Kielstra et al. | |

OTHER PUBLICATIONS

Czajkowski et al., "Multitasking Without Compromise: A Virtul Machine Evolution", ACM Portal, 2001, pp. 125-138.
White et al., Adapting Legacy Computational Software for XMSF, 2003, pp. 1-9. https://netlab.gmu.edu/XMSF/pubs/03F-SIW-112.pdf.

(Continued)

*Primary Examiner* — Lewis A Bullock, Jr.
*Assistant Examiner* — Mark Gooray
(74) *Attorney, Agent, or Firm* — Yee & Associates, P.C.; Libby Z. Toub (57) ABSTRACT

A method, apparatus, and computer instructions are provided for inlining native functions into compiled Java code. A conversion engine is provided by the present invention for converting the intermediate representation of native functions to the just-in-time (JIT) compiler's intermediate representation. With the converted intermediate representation, an inliner recursively inlines the converted JIT compiler's intermediate representation into the native callsite to remove the need of invoking the native function and subsequent native calls made by the function. The inlining process continues until either a call to an opaque function is encountered or until a JIT compiler intermediate representation growth limits are reached. The inliner also replaces calls to most native functions that are non-inlineable or opaque with calls to synthesized native functions that provide access to native libraries containing implementations of the original non-inlineable calls.

23 Claims, 6 Drawing Sheets

OTHER PUBLICATIONS

USPTO Notice of Allowance for U.S. Appl. No. 12/366,355 dated Nov. 16, 2010.

Kurzyniec et al., "Efficient Cooperation between Java and Native Codes—JNI Performance Benchmark", Emory University, In Proceedings of the 2005 International Symposium on Code Generation and Optimization, Palo alto, California, Mar. 20-24, 2005, pp. 75-86.

Bothner, "Java/C++integration", Writing native Java methods in natural C++, Cygnus Solutions, Nov. 1997, 11 pages. http://gcc/gnu.org/java/papers/native++.html.

Bacon, "JaLA: a Java package for Linear Algebra", presented at the Computer Science Division, University of California, Berkeley, 1998, IBM T.J. Watson Research Center, pp. 1-10.

Newmonics Inc., "Best Practices for Native Code Integration with PERC®", Feb. 26, 2003, pp. 1-8. http://www.newmonics.com/perceval/whitepapers,shtml.

Veldema et al., "Jcc, a native Java compiler", Master's thesis, Department of Mathematice and Computer Science, Vrije Universiteit, The Netherlands, Jul. 31, 1998, pp. Cover p.-51.

Eckel, "Raw Native Interface (RNI)", 2004, 3 pages. http://www.codeguru.com/java/tij/tij0194.shtml.

"IBM Rewrites the Book on Java™ Performance", 17 pages. http://www.developer.ibm.com/java/j2/j2perfpaper.html.

Triplett, "Evolving performance of the Java Virtual Machine: A Timeline of Performance Improvements to the JVM", Dec. 1, 2001, pp. 1-4. http://www-106.ibm.com/developerworks/java/library/j-berry/sidebar.html.

Intel Corp., "The Open Runtime Platform: A Flexible High-Performance Managed Runtime Environment—The Just-in-Time Compiler Interface—Native Method Support", Intel Technology Journal, vol. 7, Issue 1, Feb. 19, 2003, pp. 1-8. http://www.intel.com/technology/itj/2003volume07issue01/art01_o...

Liang, "The Java™ Native Interface", Programmer's Guide and Specification, Addison-Wesley, Copyright © 1999 Sun Microsystems, Inc. pp. cover page-303.

Welsh et al., "Jaguar: Enabling Efficient Communication and I/O in Java", University of California, Berkeley, CA, Dec. 1999, 14 pages.

"Native Inlining", 1 page. http://ww.str.com.au/jnibench/native_inlining.htm.

Way et al., "Region Formation Analysis with Demand-driven Inlining for Region-based Optimization", 2000, Proceedings of the 2000 International Conference on Parallel Architectures and Compilation Techniques, pp. 24-33.

Leupers et al., "Function Inlining under Code Size Constraints for Embedded Processors", 1999, International Conference on Computer-Aided Design, pp. 253-256.

Ishizaki et al., "A Study of Devirtualization Techniques for a Java Just-In-Time Compiler", 2000, Proc. ACM SIGPLAN Conference on Object-Oriented Programming Systems, Languages and Applications, pp. 294-310.

Ayers et al., "Agressive Inlining", 1997, Proceedings of the ACM SIGPLAN 1997 Conference on Programming Language Design and Implementation, pp. 134-145.

Ishizaki et al., "Design, Implementation, and Evaluation of Optimizations in a Just-In-Time Compiler", 1999, Proceedings of the ACM SIGPLAN JavaGrande Conference, pp. 119-128.

Wu et al., "Improving Java Performance Through Semantic Inlining", 1998, IBM Research Report RC 21313.

\* cited by examiner

```
class DummyCall ~1000
{
    public static native int dummy(); ~1002
    public static void main(String [] args) ~1004
    {
        int x = dummy() + dummy();
    }   /      \        \
}     1006    1008     1010
```

*FIG. 10A*

```
#include <jni.h>
#include "DummyCall.h"                    1020

JNIEXPORT jint JNICALL Java_DummyCall_dummy
                      (JNIEnv * env, jclass cls)
{
    return 100;
}
```

*FIG. 10B*

```
Method: (main) ~1030
Integer-store into automatic variable [<temporary 1>]
- Integer add
    ▷  Function-call to method DummyCall.dummy()I ~1032
    ○  Load-address static[<address of class object>]
    ▷  Function-call to method DummyCall.dummy()I ~1034
    ○  Load-address static[<address of class object>]
```

*FIG. 10C*

```
Method: (main) ~1040
Integer-store into automatic variable [<temporary 1>]
- Integer add
    ▷  100  (NOTE: Function-call eliminated)
       100  (NOTE: Function-call eliminated)
```

*FIG. 10D*

```
Method: (main)
Integer-store into automatic variable [<temporary 1>]
       200
```

*FIG. 10E* ated as U.S. Pat. No. 7,490,320 on Feb. 10, 2009.

INLINING NATIVE FUNCTIONS INTO COMPILED JAVA CODE

CROSS-REFERENCE TO RELATED APPLICATION

The present invention is related to the application entitled "METHOD AND APPARATUS FOR TRANSFORMING JAVA NATIVE INTERFACE FUNCTION CALLS INTO SIMPLER OPERATIONS DURING JUST-IN-TIME COMPILATION", Ser. No. 11/062,306 filed on Feb. 18, 2005 and issued as U.S. Pat. No. 7,490,320 on Feb. 10, 2009.

BACKGROUND OF THE INVENTION

1. Technical Field

The present invention relates to an improved data processing system. In particular, the present invention relates to Java native functions in a data processing system. Still more particular, the present invention relates to inlining Java native function calls in compiled Java code in a data processing system.

2. Description of Related Art

Java is an object oriented programming language and environment focusing on defining data as objects and the methods that may be applied to those objects. Java supports only single inheritance, meaning that each class can inherit from only one other class at any given time. Java also allows for the creation of totally abstract classes known as interfaces, which allow the defining of methods that may be shared with several classes without regard for how other classes are handling the methods. Java provides a mechanism to distribute software and extends the capabilities of a Web browser because programmers can write an applet once and the applet can be run on any Java enabled machine on the Web.

The Java virtual machine (JVM) is a virtual computer component that resides only in memory. The JVM allows Java programs to be executed on different platforms as opposed to only the one platform for which the code was compiled. Java programs are compiled for the JVM. In this manner Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run time system. The Java compiler generates Bytecode instructions that are non-specific to particular computer architectures. A Bytecode is a machine independent code generated by the Java compiler and interpreted by a Java interpreter. A Java interpreter is a module in the JVM that alternatively decodes and executes a Bytecode or Bytecodes. These Bytecode instructions are designed to be easy to interpret on any machine and easily translated on the fly into native machine code.

A development environment, such as the Java Development Kit (JDK) available from Sun Microsystems, Inc., may be used to build Java Bytecode from Java language source code and libraries. This Java Bytecode may be stored as a Java application or applet on a Web Server, where it can be downloaded over a network to a user's machine and executed on a local JVM.

The Java run-time environment is specifically designed to limit the harm that a Java application can cause to the system that it is running on. This is especially important with the World Wide Web, where Java applets are downloaded and executed automatically when a user visits a Web page that contains Java applets. Normally one would not want to execute random programs; they might contain viruses, or they might even be potentially malicious themselves and not merely carrying unwelcome code unintentionally. Unless the user specifically allows it (by setting the appropriate flags in the user-interface to the JVM), a Java applet cannot read or write to attached storage devices (except perhaps to a specific, restricted area), nor can it read or write to memory locations (except to a specific, restricted area).

Not only are Java applets designed for downloading over the network, standard Java libraries also specifically support client-server computing. The Java language includes provisions for multi-threading and for network communications. Compared to other languages (such as C), it is much easier to write a pair of programs, one executing locally on the user's computer that is handling the user-interaction, and the other executing remotely on a server, which is performing potentially more sophisticated and processor-intensive work.

While the Java language is designed to be platform-independent, and to execute primarily in a secure environment, programmers can extend Java applications through the use of compiled native binary code on the host operating system using C-style calling conventions through the Java Native Interface (JNI). In this fashion, a Java application can have complete access to the host operating system, including reading and writing to attached I/O devices, memory, etc. Because of this, Java programs can accomplish tasks that are not normally allowed via the JVM at the cost of being platform-specific. However, with a well-designed architecture, a Java language programmer can cleanly isolate the platform-independent portion, and present a clean, platform-independent object API to other Java components while at the same time accomplishing platform-specific tasks.

When invoking native function calls in the compiled Java code through the JNI, overheads are associated. For example, work must be performed at run time in order to prepare the call for invocation. Generally, a native library containing the native function must be loaded on or before being called. The native function must also be resolved in the runtime system, and related JVM data structures must be updated to indicate the use of the native function.

In addition, the JVM must also set up native stacks and/or registers according to the functional calling convention of the underlying operating system architecture and perform null-checking on reference arguments. For some JVMs, set up is also needed to add information for garbage collection. Upon returning from the native code, the used stack and/or registers must be restored after the return value from the native code is returned to the Java runtime environment.

Several attempts have been made to minimize the overhead of invoking native functions. The first of which are programmer-based optimizations that put the onus on the application programmer to practice efficient coding techniques when writing Java code that uses native functions. For example, batching native calls and passing as much data as possible to native code per function call, such that boundary crossing in Java programs may be reduced.

Another attempt to minimize the overhead involves restricting the type of functionality offered in the native code. For example, mechanisms which bypass construction of special wrapper code that would otherwise be found preceding native call frames on the call stack. However, such mechanisms can only be used for methods that are guaranteed not to require stack-walking support, including garbage collection, exception handling, synchronization or security, since these are services that the wrapper code helps to provide.

In yet another attempt to minimize overhead, work is performed to introduce unmanaged memory into the JVM by mapping Bytecodes to low-level assembly statements. With high speed access to unmanaged memory, shared memory segments, memory mapped files, communication and I/O buffers and memory mapped hardware devices may be implemented. However, this attempt does not recognize and map long complex sequences of Bytecodes, or apply mappings to virtual method invocations, since code mappings cannot handle dynamic class loading.

While the above attempts minimize some overhead of native function calls, each of the attempts has its own drawback. Therefore, it would be advantageous to have an improved method, apparatus, and computer instructions that target optimization of native function calls, in order to minimize the overhead.

SUMMARY OF THE INVENTION

The present invention provides a method, an apparatus, and computer instructions for inlining native functions into compiled Java code. When a native function call in a Java program is detected, a conversion engine provided by the present invention is used to convert an intermediate representation of the native function to a just-in-time compiler intermediate representation. Next, the just-in-time compiler intermediate representation is inlined into the Java native callsite by a JIT compiler inliner, and any native calls which are contained in the inlined code are also recursively inlined.

If, during inlining, the inliner determines that a just-in-time compiler growth limit is reached, a native call is made to an opaque function, or no additional native function call is present in the native function implementation, the recursive inlining process terminates. An opaque function is one for which the just-in-time compiler can not render an intermediate representation.

The conversion engine converts the intermediate representation of the native function by iterating through the intermediate representation (which was produced by the high-level language compiler) and generating a just-in-time compiler intermediate representation for each instruction in the intermediate representation. The intermediate representation of the native function is retrieved from a native library containing both native binaries and the intermediate representation of the native function.

Responsive to determining that the native function call is not to an opaque function, the inliner replaces the native function call with the actual implementation of the native function using the intermediate just-in-time compiler intermediate representation, and materializes a JNI environment pointer and passes the pointer to the actual implementation of the native function call.

Responsive to determining that the native function call is to an opaque function and that the native function call does not represent a call from Java to a native function, the inliner synthesizes a new call to a Java callable function whose purpose is to call the native function, and replaces the original native function call with a call to the synthesized native function, wherein the synthesized native function provides access to a native library containing the implementation of the opaque function target.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
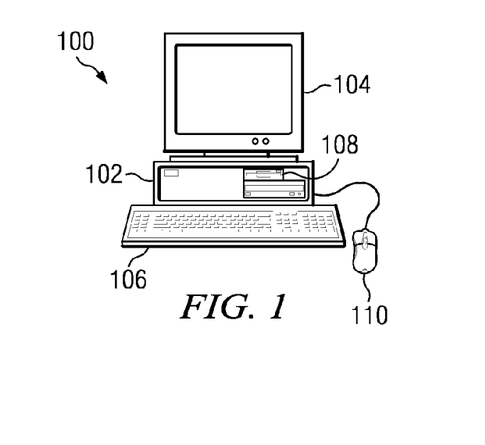
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
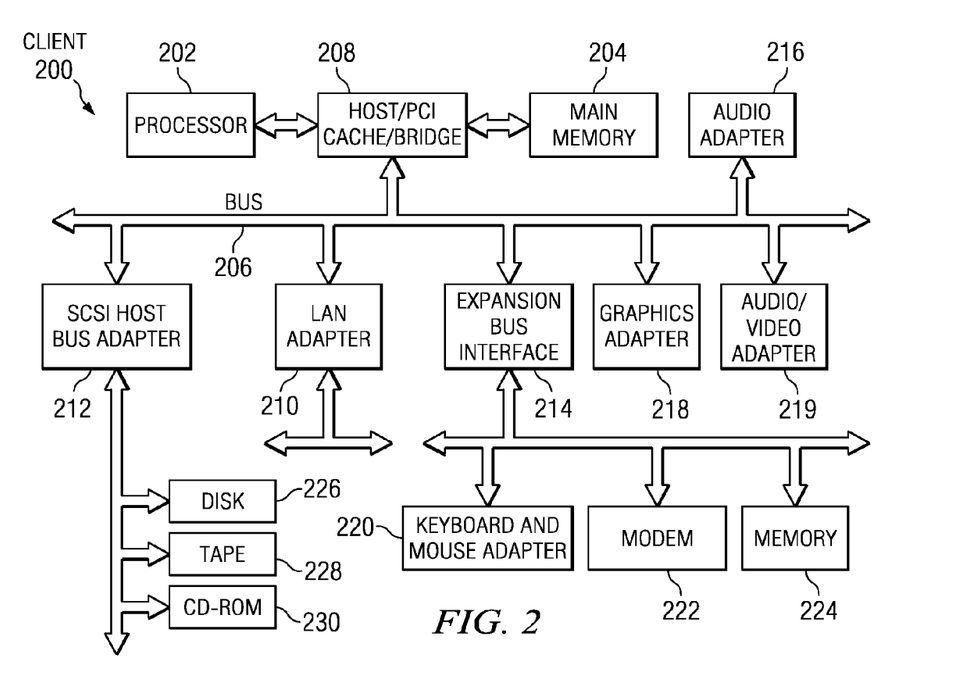
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on the data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Figure 3:
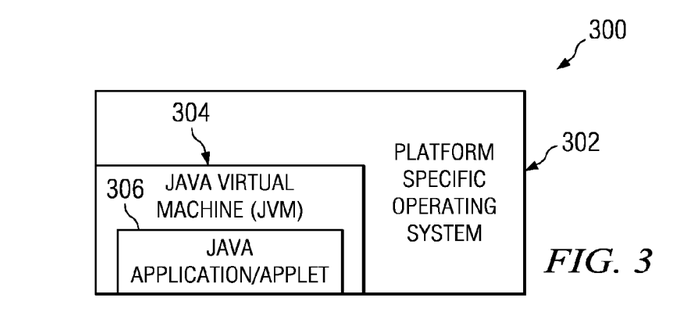
FIG. 3 is a block diagram illustrating a data processing system in which the present invention may be implemented.

With reference now to FIG. 3, a block diagram illustrating the relationship of software components operating within a computer system that may implement the present invention. Java-based system 300 contains a platform specific operating system 302 that provides hardware and system support to software executing on a specific hardware platform. JVM 304 is one software application that may execute in conjunction with the operating system. JVM 304 provides a Java run-time environment with the ability to execute a Java application or applet 306, which is a program, servlet, or software component written in the Java programming language. The computer system in which JVM 304 operates may be similar to data processing system 200 or computer 100 described above. However, JVM 304 may be implemented in dedicated hardware on a so-called Java chip, Java-on-silicon, or Java processor with an embedded picoJava core.

At the center of a Java run-time environment is the JVM, which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java Bytecodes and may use a range of techniques to execute the instructions represented by the Bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates Bytecode instructions that are nonspecific to a particular computer architecture. A Bytecode is a machine independent code generated by the Java compiler and executed by a Java interpreter. A Java interpreter is part of the JVM that alternately decodes and interprets a Bytecode or Bytecodes. These Bytecode instructions are designed to be easy to interpret on any computer and easily translated on the fly into native machine code. Bytecodes are may be translated into native code by a just-in-time (JIT) compiler.

A JVM loads class files and executes the Bytecodes within them. The class files are loaded by a class loader in the JVM. The class loader loads class files from an application and the class files from the Java application programming interfaces (APIs) which are needed by the application. The execution engine that executes the Bytecodes may vary across platforms and implementations.

One type of software-based execution engine is a JIT compiler. With this type of execution, the Bytecodes of a method are compiled into native machine code upon successful fulfillment of some type of criteria for JIT compiling a method. The native machine code for the method is then cached and reused upon the next invocation of the method. The execution engine may also be implemented in hardware and embedded on a chip so that the Java Bytecodes are executed natively. JVMs usually interpret Bytecodes, but JVMs may also use other techniques, such as just-in-time compiling, to execute Bytecodes.

When an application is executed on a JVM that is implemented in software on a platform-specific operating system, a Java application may interact with the host operating system by invoking native methods. A Java method is written in the Java language, compiled to Bytecodes, and stored in class files. A native method is written in some other language and compiled to the native machine code of a particular processor. Native methods are stored in a dynamically linked library whose exact form is platform specific.

Figure 4:
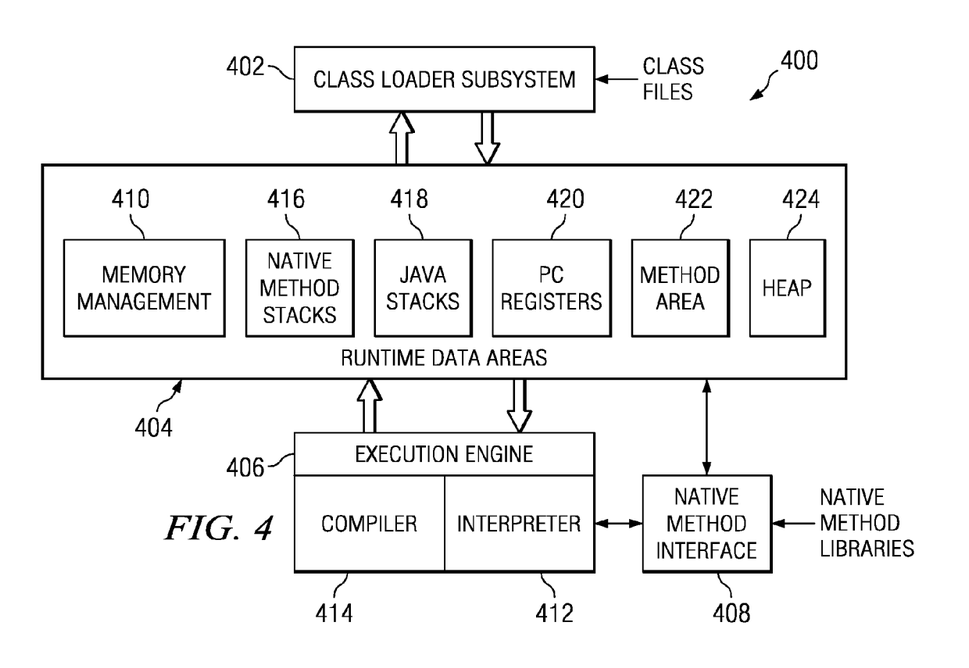
FIG. 4 is a block diagram of a JVM in accordance with a preferred embodiment of the present invention.

With reference now to FIG. 4, a block diagram of a JVM is depicted in accordance with a preferred embodiment of the present invention. JVM 400 includes class loader subsystem 402, which is a mechanism for loading types, such as classes and interfaces, given fully qualified names. JVM 400 also contains runtime data areas 404, execution engine 406, native method interface 408, and memory management 410. Execution engine 406 is a mechanism for interpreting or executing instructions contained in the methods of classes loaded by class loader subsystem 402. Execution engine 406 may be, for example, Java interpreter 412 or just-in-time compiler 414. Native method interface 408 allows access to resources in the underlying operating system. Native method interface 408 may be, for example, the Java Native Interface (JNI).

Runtime data areas 404 contain native method stacks 416, Java stacks 418, PC registers 420, method area 422, and heap 424. These different data areas represent the organization of memory needed by JVM 400 to execute a program.

Java stacks 418 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method is complete, the JVM pops the frame for that method and discards it. The JVM does not have any registers for holding intermediate values; any Java instruction that requires or produces an intermediate value uses the stack for holding the intermediate values. In this manner, the Java instruction set is well-defined for a variety of platform architectures.

Program counter (PC) registers 420 are used to indicate the next instruction to be executed.

Native method stacks 416 stores the state of invocations of native methods. The state of native method invocations is stored in an implementation-dependent way in native method stacks, registers, or other implementation-dependent memory areas. In some JVM implementations, native method stacks 416 and Java stacks 418 are combined.

Method area 422 contains class data while heap 424 contains all instantiated objects. The constant pool is located in method area 422 in these examples. The JVM specification strictly defines data types and operations. Most JVMs choose to have one method area and one heap, each of which is shared by all threads running inside the JVM, such as JVM 400. When JVM 400 loads a class file, it parses information about a type from the binary data contained in the class file. JVM 400 places this type of information into the method area. Each time a class instance or array is created, the memory for the new object is allocated from heap 424. JVM 400 includes an instruction that allocates memory space within the memory for heap 424 but includes no instruction for freeing that space within the memory. Memory management 410 in the depicted example manages memory space within the memory allocated to heap 424. Memory management 410 may include a garbage collector, which automatically reclaims memory used by objects that are no longer referenced. Additionally, a garbage collector also may move objects to reduce heap fragmentation.

The present invention provides a method, an apparatus, and computer instructions for recursively inlining native functions in compiled Java code. The present invention avoids Java programs from making native function calls by replacing the intermediate representation of the invocation of native functions with an intermediate representation of the corresponding method body during JIT compilation. An intermediate representation is an internal representation of source code generated by the JIT compiler and includes program constructs that are used to perform optimization when the source code is compiled to generate binary machine code.

In a preferred embodiment, the present invention enables any compiler trying to inline a Java callable native callsite to consume the intermediate representation of the native function and convert it to its own intermediate representation to perform optimization. A native callsite is a Java statement in any program that calls a native function. Using the present invention, a JIT compiler inliner inlines a native function by converting the intermediate representation of the native function to the JIT compiler's intermediate representation thereby treating native method bodies as conceptually as Java function bodies although maintaining the semantics of the original source language of the native method, and recursively inlines any native calls (in particular, non-Java callable ones) the inlined native code may contain.

The present invention includes a conversion engine that utilizes the generated native function intermediate representation to embed into the JIT compiler environment native libraries that contain intermediate representation of native functions in addition to the binary representation of the compiled code. In other words, the conversion engine imports the intermediate representation of the native functions stored in native libraries into the JIT compiler. For each instruction encountered, the engine generates new JIT compiler intermediate representation statements. The JIT compiler subsequently treats the intermediate representation as if it was derived from Java Bytecodes while maintaining adherence to the semantics of the original source language of the native method.

In addition, the present invention includes an inliner that inlines the converted JIT compiler intermediate representation into the native callsite to remove the need to invoke the native function. The inlining process, which is recursive, includes examining native callsites and determining if a native function call may be replaced with an actual implementation of the function. The actual implementation of the function is the body of the function in the JIT intermediate representation format.

If the native function call is replaceable with the actual implementation of the function in the JIT intermediate representation format, the inlining process continues to perform inlining work, such as mapping parameters to arguments, merging native compiler and JIT compiler intermediate representations, control flow graphs, and materializing a pointer to JNIEnv structure so that it can be used by inlined statements making calls to the Java Native Interface to perform normal system activities.

However, if the native function call is not replaceable with the actual implementation of the function in the JIT intermediate representation, the present invention takes one of two paths: (i) if the callsite was created while processing Bytecodes (i.e. the callsite represents a call from Java to a native method), no further processing is performed on the callsite or (ii) if the callsite occurs within a native context (i.e. within inlined non-Java callable native code), the native function call is replaced by a call to a synthesized native function that provides access to the native libraries. Such a non-inlinable function is known as an opaque function. The native libraries include implementations of the original native function calls. In this way, calls to the opaque method may be replaced with direct calls to the function implementation in the native libraries.

In order to synchronize data that is shared between inlined native functions and other functions, such as synthesized native functions, the present invention provides the proper linkage to shared memory, such that inlined native function and non-inlined native functions are able to read and write to the same data segment.

Furthermore, the present invention inserts code to provide interaction between inlined native functions and JVM components. For example, instructions to perform handshaking with garbage collection components are inserted after inlining is performed.

Figure 5:
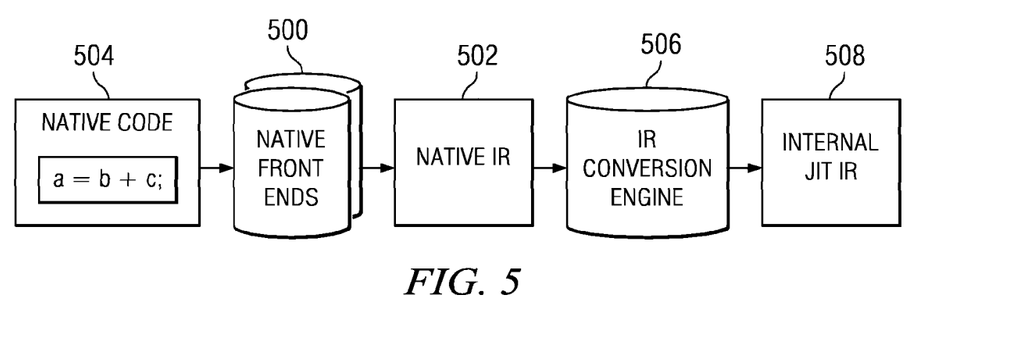
FIG. 5 is a diagram illustrating a conversion process for converting the intermediate representation of the native function to the JIT compiler's intermediate representation in accordance with a preferred embodiment of the present invention.

Turning now to FIG. 5, a diagram illustrating a conversion process for converting intermediate representation of the native function to JIT compiler intermediate representation is depicted in accordance with a preferred embodiment of the present invention. As depicted in FIG. 5, native front end 500 provides native intermediate representation 502 for native code 504. An example of native front end 500 may be a C/C++ compiler.

Conversion engine 506 of the present invention iterates over native intermediate representation 502 generated by native front end 500 and generates new JIT compiler intermediate representation 508 for each instruction that is encountered for the native code. Thus, instead of using Java Bytecodes as an input, conversion engine 506 uses native intermediate representation 502 as an input. Once the native intermediate representation 502 is processed, the JIT compiler subsequently treats the generated JIT compiler intermediate representation 508 as if it were derived from Java Bytecodes while maintaining adherence to the semantics of the original source language of the native method. Conversion engine 506 also provides linkages appropriate to the language that has been inlined, for example, arguments that are called by the function.

Figure 6:
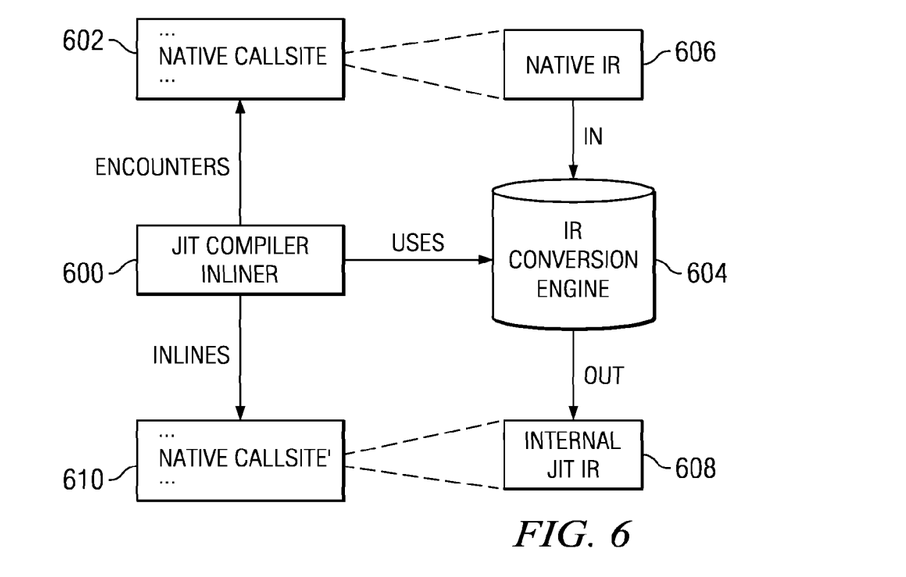
FIG. 6 is a diagram illustrating one step in the recursive native inlining process in accordance with a preferred embodiment of the present invention.

Turning now to FIG. 6, a diagram illustrating one step in the recursive native inlining process is depicted in accordance with a preferred embodiment of the present invention. As shown in FIG. 6, JIT compiler inliner 600 analyzes callsite 602 to determine if it is a native function call. If 602 is a native function call, JIT compiler inliner 600 uses conversion engine 604 to convert the native intermediate representation 606 of the native function to JIT compiler intermediate representation 608.

With the JIT compiler intermediate representation 608, JIT compiler inliner 600 inlines the native function call in the compiled Java code by replacing the function call of callsite 610 with the actual implementation of the function, which is the body of the function in the JIT compiler intermediate representation 608 format. In addition, JIT compiler inliner 600 performs inlining work, such as mapping parameters to arguments, merging native compiler and JIT compiler intermediate representations, control flow graph, and materialization of a pointer to JNIEnv structure, such that inlined statements may make calls the Java Native Interface (JNI). It is noted that C or C++ compiler intermediate representation 608 may be stored along side with program libraries.

During the inlining process, JIT compiler inliner 600 may detect native intermediate representation 606 that cannot proceed through the rest of the JIT compiler processing, since it may make calls to procedures for which the JIT compiler cannot render an intermediate representation. For example, when a system call made into an operating system kernel could not be inlined by the JIT compiler.

Figure 7:
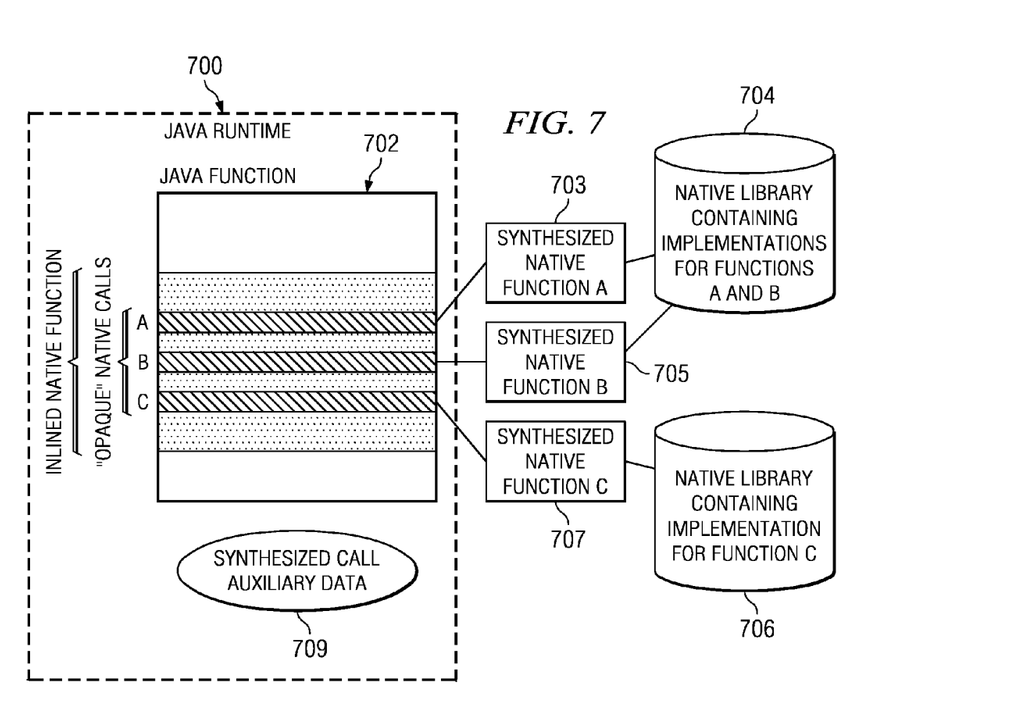
FIG. 7 is a diagram illustrating synthesized native functions in accordance with a preferred embodiment of the present invention.

Turning now to FIG. 7, a diagram illustrating synthesized Java callable native functions is depicted in accordance with a preferred embodiment of the present invention. As depicted in FIG. 7, in cases where an intermediate representation cannot proceed through the JIT compiler processing, JIT compiler inliner replaces calls to the native functions that are non-inlineable or opaque with calls to synthesized Java callable native functions that provide access to native libraries containing implementations of the original non-inlineable calls.

In this illustrative example, Java runtime 700 includes one inlined native function 702. Within inlined native function 702, calls to opaque native functions a, b, and c are present. Since function calls a, b, and c are not inlineable, the JIT compiler inliner, such as JIT compiler inliner 600 in FIG. 6, replaces the native function calls a, b, and c with synthesized native function calls a 703, b 705, and c 707. Synthesized native functions a 703 and b 705 provide access to native library containing implementations for functions a and b 704, while synthesized native function c 707 provides access to native library container implementation for function c 706.

In order to ensure that the Java runtime is updated to indicate existence of the synthesized native functions, synthesized auxiliary data 709 is also generated by the JIT compiler inliner. For some cases where the opaque function is a well known library function, the call to the function may be effected without going through the entire intermediate native method.

Within a Java function, there may be inlined and non-inlined native function calls, such as synthesized native function, another function in the same library, or a function defined in a different library. The present invention protects data that is shared between inlined and non-inlined native functions, such as global variables accessed by the program, by providing correct linkages to the shared data and ensuring that both the inlined and the non-inlined native function calls are able to read and write to the same portion of shared memory where the shared data is stored. Shared data may be any external or static data, as well as addresses of variables that may be passed by an inlined native function call to a synthesized function call.

Figure 8:
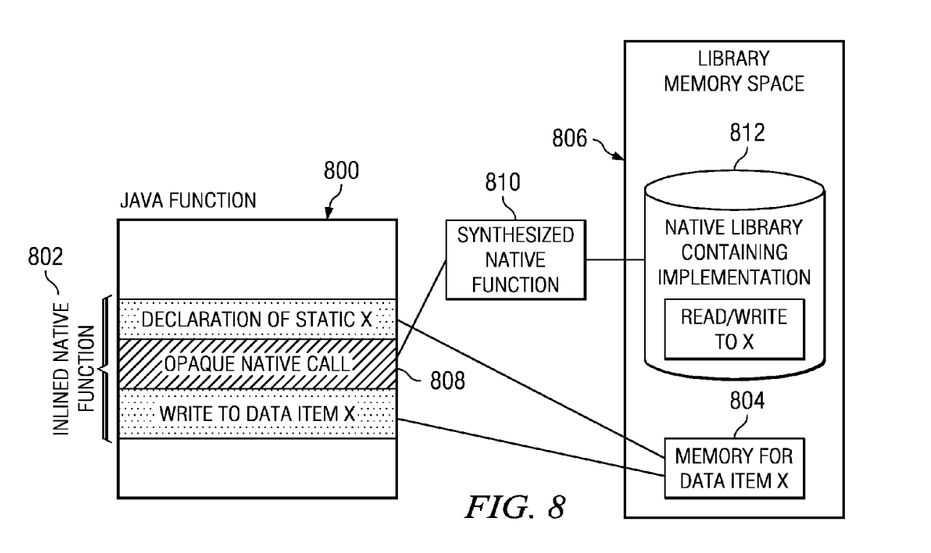
FIG. 8 is a diagram illustrating linkage between inlined and synthesized native functions in accordance with a preferred embodiment of the present invention.

Turning now to FIG. 8, a diagram illustrating linkage between inlined and synthesized native functions is depicted in accordance with a preferred embodiment of the present invention. As shown in FIG. 8, Java function 800 includes inlined native function 802. Inlined native function 802 includes a declaration of static variable x and a write to the same variable x. Memory for static variable x 804 is stored within library memory space 806.

In addition, inlined native function 802 includes a call to an opaque native function 808. As mentioned above, the JIT compiler inliner replaces the native call 808 with synthesized native function call 810, such that access to the native library containing the implementation of reading and writing to x 812 in library memory space 806 is provided.

The present invention provides linkages from both inlined native function 802 and actual native function (which will be called by the synthesized function 810) 812 to memory for static variable x 804. In this way, inlined native function 802 is able to read and write to the same portion of memory that non-inlined native functions in 812 do, where 812 was reached via 810.

Since the inlined native functions are executed in a Java runtime environment, the program code must be conditioned to interact with the appropriate JVM requirements. In particular, instructions to perform handshaking with components, such as garbage collection, are inserted by the present invention after inlining and before the remainder of the JIT compiler processing.

In the preferred embodiment, the present invention recursively inlines native functions into the native callsite until either a call to an opaque function is encountered or until intermediate representation growth limits are reached. The intermediate representation growth limits indicate how many native functions may be inlined. Since inlining increases the size of program data, a growth limit may be used, for example, to limit negative side-effects on an instruction cache. The resulting JIT compiler intermediate representation is examined, and the JIT compiler proceeds normally.

Figure 9:
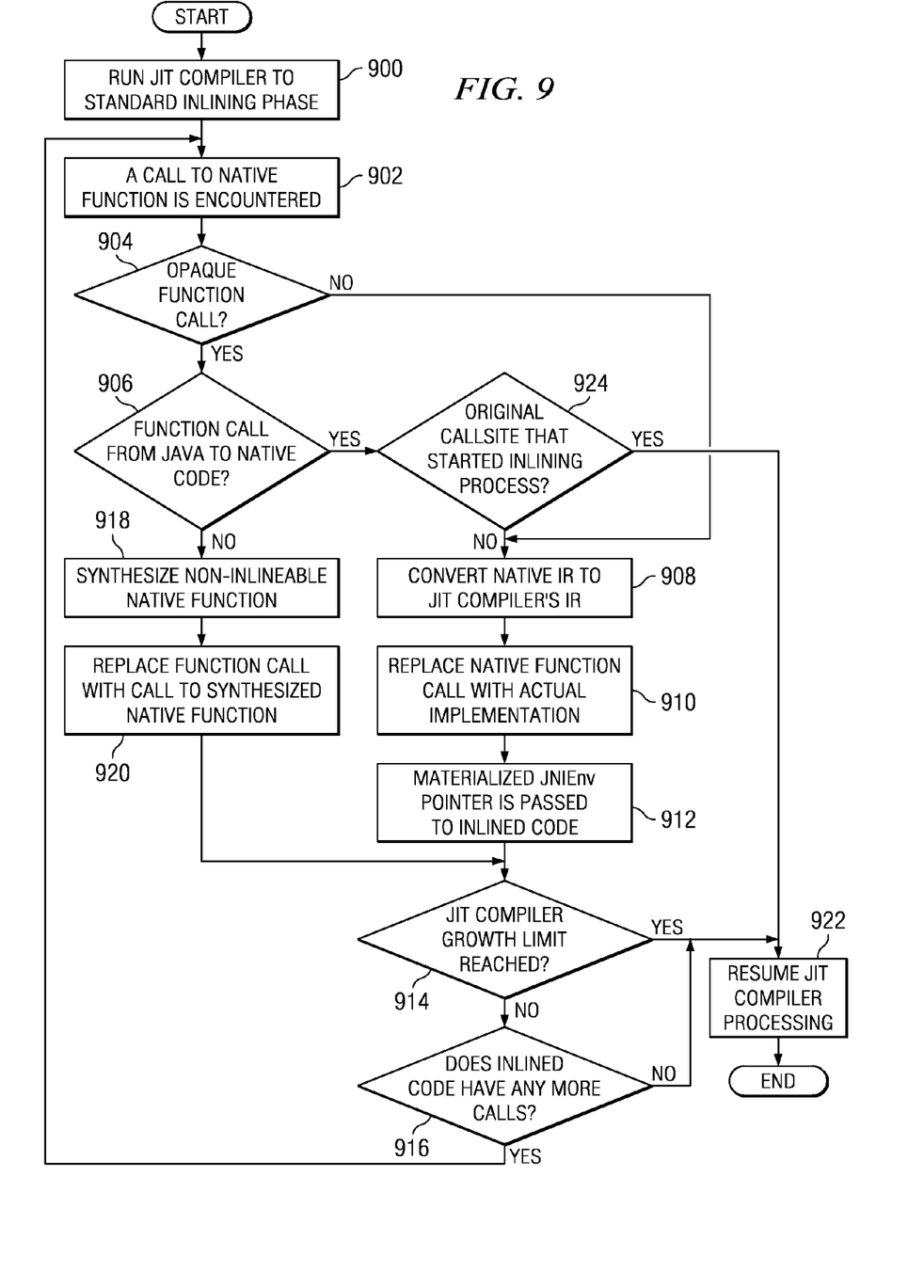
FIG. 9 is a flowchart of an exemplary process for inlining native functions into compiled Java code in accordance with a preferred embodiment of the present invention.

Turning now to FIG. 9, a flowchart of an exemplary process for inlining native functions into compiled Java code is depicted in accordance with a preferred embodiment of the present invention. As depicted in FIG. 9, the process begins when the JIT compiler is run by the Java runtime environment to its standard inlining phase (step 900).

During this phase, a native function call is encountered (step 902). Since the intermediate representation of the native function is stored along side its binary representations in native libraries, the intermediate representation generated by the native compiler is used. However, other schemes, such as analyzing native function's binary code may be used. The key is to map the native function to the JIT compiler's intermediate representation. When the native function call is encountered, the conversion engine of the present invention makes a determination as to whether or not the native function call is opaque (step 904). If the native function call is to an opaque function, the process continues to step 906.

At step 906, the JIT compiler inliner determines whether the callsite was created while processing Java Bytecodes (i.e. the callsite represents a call from Java to a native function). If the callsite was created while processing Java Bytecodes, it proceeds to step 924 to check whether the callsite is the original one that started the entire inlining process. If it is, the JIT compiler proceeds to step 922, avoiding inlining the callsite. Returning to step 924, if the callsite was not the original one, then it proceeds to step 908 where it commences the intermediate conversion process.

Back at step 906, if the callsite does not represent a call from Java to a native function, meaning that the call to an opaque function occurs within inlined native code, the compiler process proceeds to step 918. At step 918, the JIT compiler inliner synthesizes a Java callable native function whose purpose is to invoke the original actual function and then replaces the native function call with a call to the synthesized native function (step 920) and continues to step 914.

Turning back to step 904, if the native function call is not to an opaque function, the inliner converts the native intermediate representation into JIT compiler intermediate representation (step 908) and ensures that references to symbols or storage in the JIT compiler's intermediate representation correspond correctly to symbols or storage referenced by the original code. It also replaces the native function call with the actual implementation of the function (step 910) and then materializes the JNIEnv pointer and passes it to the inlined code (step 912). The process then continues to step 914.

At step 914, the inliner makes a determination as to whether the JIT compiler growth limit has been reached. If the JIT compiler growth limit has been reached, the process continues to step 922. If the JIT compiler growth limit has not been reached, the JIT compiler inliner makes a determination as to whether additional functions calls are present in the converted intermediate representation (step 916).

If additional function calls are present in the converted intermediate representation, the process returns to step 902 to retrieve the next converted intermediate representation. Otherwise, the process continues to step 922. At step 922, the JIT compiler processing is resumed. Thus, the process terminates thereafter.

Figure 10A:
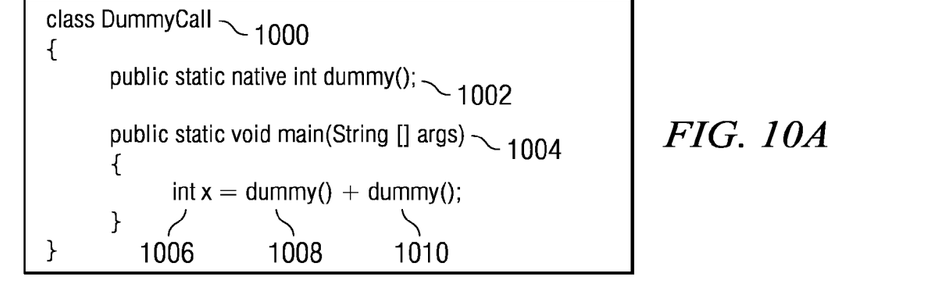
FIG. 10A is a diagram illustrating an exemplary native function call in accordance with a preferred embodiment of the present invention.

Turning now to FIG. 10A, a diagram illustrating an exemplary native function call is depicted in accordance with a preferred embodiment of the present invention. In this illustrative example, DummyCall class 1000 includes native function dummy( ) 1002 and main( ) method 1004.

Within main( ) method 1004, integer x 1006 is assigned the result of adding dummy( ) method 1008 with dummy( ) method 1010.

Figure 10B:
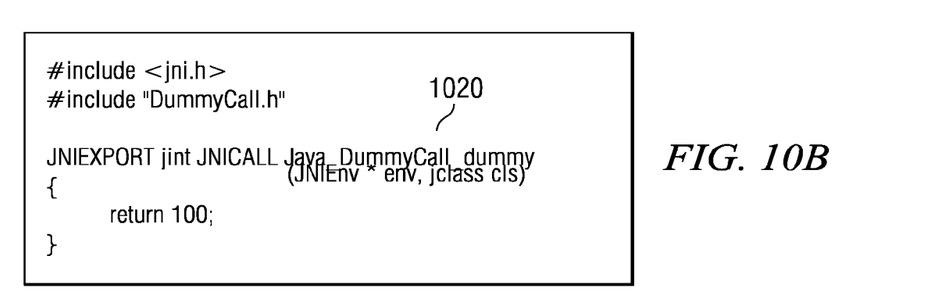
FIG. 10B is a diagram illustrating an exemplary native function call implemented in a non-Java language in accordance with a preferred embodiment of the present invention.

Turning now to FIG. 10B, a diagram illustrating an exemplary native function implemented in a non-Java language is depicted in accordance with a preferred embodiment of the present invention. In this illustrative example, dummy( ) method 1002 from FIG. 10A is implemented using a non-Java language, such as C.

As a result, dummy( ) method 1020 is shown in FIG. 10B. dummy( ) method 1020 returns a value of '100'.

Figure 10C:
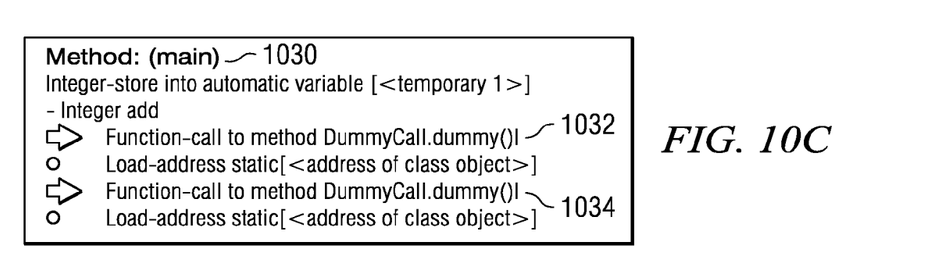
FIG. 10C is a diagram illustrating an annotated tree-based intermediate representation without inlining for the main method in the DummyCall class in accordance with a preferred embodiment of the present invention.

Turning now to FIG. 10C, a diagram illustrating an annotated tree-based intermediate representation without inlining for the main method in DummyCall class is depicted in accordance with a preferred embodiment of the present invention. As shown in FIG. 10C, main method 1030 is the intermediate representation for main method 1004 in FIG. 10A generated by a compiler without inlining.

In this intermediate representation, main method 1030 first sums return values from two consecutive function calls to native function dummy 1032 and dummy 1034. Main method 1030 then stores the result to a temporary variable x. With main method 1030, overhead is incurred at run time when the native function is invoked for reasons mentioned earlier in this docket.

Figure 10D:
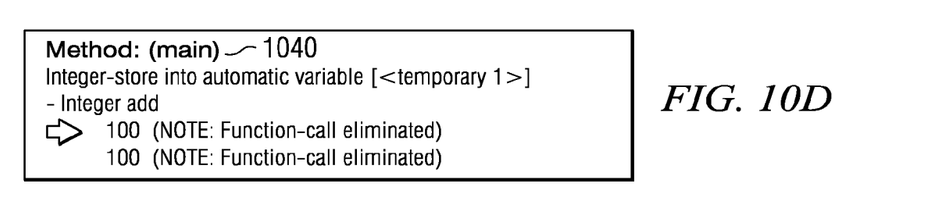
FIG. 10D is a diagram illustrating an annotated tree-based intermediate representation with inlining for the main method in DummyCall class in accordance with a preferred embodiment of the present invention.

Turning now to FIG. 10D, a diagram illustrating an annotated tree-based intermediate representation with inlining for the main method in the DummyCall class is depicted in accordance with a preferred embodiment of the present invention. As shown in FIG. 10D, main method 1040 is generated by a JIT compiler which inlines native functions at compile time.

Thus, instead of invoking native function dummy 1032 or 1034 at runtime, main method 1040 includes the actual implementation of dummy method 1032 and 1034. This technique is enabled, because the JIT compiler intermediate representation is known at compile time and optimization may be performed to expand what used to be an opaque callsite to an actual implementation of the function.

In this example, native function calls to native functions dummy 1032 and 1034 are eliminated and replaced with constant values 100.

Figure 10E:
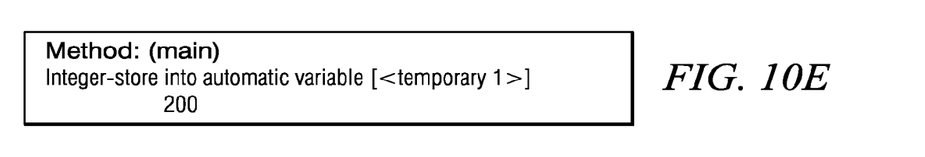
FIG. 10E is a diagram illustrating an optimized tree-based intermediate representation with inlining for the main method in DummyCall class in accordance with a preferred embodiment of the present invention.

Turning now to FIG. 10E, a diagram illustrating an optimized tree-based intermediate representation with inlining for the main method in the DummyCall class is depicted in accordance with a preferred embodiment of the present invention. As shown in FIG. 10E, if the compiler further optimizes the generated representation in FIG. 10D, the compiler may replace the addition with a value of 200 as shown in FIG. 10E.

By inlining native function calls at JIT compile time, invocation of native functions and associated overheads are removed. In addition, the callsite is exposed to further optimizations, which reduce it to a constant value.

In summary, the present invention enables native function inlining by replacing the intermediate representation of native function calls with the JIT compiler's intermediate representation of the native function. The present invention refactors the resulting intermediate representation and determines which region includes opaque functions to be transformed back to invoking Java callable native functions. In addition, the present invention synthesizes native functions as appropriate and creates linkages for access to data shared between the inlined native functions and non-inlined native functions. Furthermore, the present invention inserts code in order to meet JVM requirements, such as garbage collection. In this way, native function calls are avoided as much as possible, and overhead to native function calls is thus minimized.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, although the depicted embodiment is directed towards processing Bytecodes in Java, the processes of the present invention may be applied to other programming languages and environments that process instructions, which are nonspecific to a computer on which the instructions are to be executed. In such a case, a virtual machine on the computer may interpret the instructions or send the instructions to a compiler to generate code suitable for execution by the computer on which the virtual machine is located.

The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for inlining native functions into compiled Java code, the method comprising;
   running a just-in-time compiler by a Java runtime environment to a standard inlining phase;
   responsive to running the just-in-time compiler to the standard inlining phase, detecting a native function call at a Java callsite;
   determining if the native function call is to an opaque function, wherein the call to the opaque function invokes procedures for which a just-in-time compiler cannot render an intermediate representation;
   if the native function call is to an opaque function, determine whether the Java callsite was created while processing Java bytecodes;
   if the Java callsite was not created while processing Java bytecode, synthesizing a Java callable native function, and replacing the native function call with a call to the synthesized native function, wherein the synthesized native function provides access to a native library containing an implementation of the opaque function;
   responsive to determining that the native function call is not an opaque function, converting an intermediate representation of native function to a just-in-time compiler intermediate representation and omitting inlining of native functions called from opaque functions; and
   inlining the just-in-time compiler intermediate representation into the Java callsite.

2. The method of claim 1, wherein the inlining step is recursively performed until one of the following:
   determining that a just-in-time compiler growth limit is reached; and responsive to determining that the just-in-time compiler growth limit is reached, limiting a number of native functions recursively inlined in order to limit negative side-effects on an instruction cache;
   determining that the native function call is to an opaque function; and
   determining that no additional native function call is present in a native function implementation.

3. The method of claim 1, wherein the native function call is invoked using a Java Native Interface, and is recursively inlined such that any native calls an inlined native function contains may also be subsequently inlined.

4. The method of claim 1, wherein the converting step comprises:
   iterating through the intermediate representation of the native function; and
   generating a just-in-time compiler intermediate representation for each instruction in the intermediate representation of the native function,
   wherein the intermediate representation of the native function is retrieved from a native library containing native binary code and the intermediate representation of the native function.

5. The method of claim 1, wherein the inlining step comprises:
materializing a native interface environment pointer and making the pointer available to the actual implementation of the native function call.

6. The method of claim 5, further comprising:
if the native function call is to an opaque function, determining if the native function call represents a call from Java to a native function; and
if the native function call represents a call from Java to a native function, determining if the native function call is an original function call that started an entire inlining process.

7. The method of claim 6, further comprising:
if the native function call is the original function call that started the entire inlining process, resuming just-in-time compiler processing;
if the native function call is not an original function call that started the entire inlining process, converting the intermediate representation of the native function call to a just-in-time compiler intermediate representation.

8. The method of claim 1, wherein the just-in-time compiler intermediate representation is subsequently treated as Java Bytecodes, while maintaining adherence to semantics of original source language of the native function, by a just-in-time compiler after the converting step.

9. The method of claim 5, wherein the inlining step further comprises:
mapping parameters to arguments; and
merging native compiler and JIT compiler intermediate representation and control flow graphs.

10. The method of claim 6, further comprising:
inserting code to the compiled Java code to provide linkage to shared memory for data shared by inlined native functions, synthesized native functions and other functions in the native library.

11. The method of claim 6, further comprising:
inserting code in the compiled Java code to provide interaction between the actual implementation of the native function call and virtual machine components.

12. The method of claim 1, wherein the intermediate representation of the native function is binary code of the native function.

13. A data processing system for inlining native functions into compiled Java code, the data processing system comprising:
one or more processors, one or more non-transitory computer readable mediums, and one or more computer readable memories;
program instructions, stored in at least one non-transitory computer readable medium, for running a just-in-time compiler by a Java runtime environment to a standard inlining phase;
program instructions, stored in at least one non-transitory computer readable medium, for detecting, responsive to running the just-in-time compiler to the standard inlining phase, a native function call at a Java callsite;
program instructions, stored in at least one non-transitory computer readable medium, for determining if the native function call is to an opaque function, wherein the call to the opaque function invokes procedures for which a just-in-time compiler cannot render an intermediate representation;
program instructions, stored in at least one non-transitory computer readable medium, for determining, responsive to determining that the native function call is to an opaque function, whether the Java callsite was created while processing Java bytecodes;
program instructions, stored in at least one non-transitory computer readable medium, for synthesizing, responsive to determining that the Java callsite was not created while processing Java bytecode, a Java callable native function, and replacing the native function call with a call to the synthesized native function, wherein the synthesized native function provides access to a native library containing an implementation of the opaque function;
program instructions, stored in at least one non-transitory computer readable medium, for converting, responsive to determining that the native function call is not an opaque function, an intermediate representation of native function to a just-in-time compiler intermediate representation and omitting inlining of native functions called from opaque functions;
program instructions, stored in at least one non-transitory computer readable medium, for inlining the just-in-time compiler intermediate representation into the Java callsite.

14. The data processing system of claim 13, further comprising:
program instructions, stored in at least one non-transitory computer readable medium for recursively inlining until a just-in-time compiler growth limit is reached, and responsive to determining that the just-in-time compiler growth limit is reached, limiting a number of native functions recursively inlined in order to limit negative side-effects on an instruction cache until determining that the native function call is to an opaque function and until determining that no additional native function call is present in a native function implementation.

15. The data processing system of claim 13, wherein the native function call is invoked using a native interface, and is recursively inlined such that any native calls an inlined native function contains may also be subsequently inlined.

16. The data processing system of claim 13, further comprising:
program instructions, stored in at least one non-transitory computer readable medium, for iterating through the intermediate representation of the native function;
program instructions, stored in at least one non-transitory computer readable medium, for generating a just-in-time compiler intermediate representation for each instruction in the intermediate representation of the native function,
wherein the intermediate representation of the native function is retrieved from the native library, wherein the native library contains native binary code and the intermediate representation of the native function.

17. The data processing system of claim 13, further comprising:
program instructions, stored in at least one non-transitory computer readable medium, for replacing, responsive to determining that the native function call is not to an opaque function, the native function call with an actual implementation of the native function call using the intermediate just-in-time compiler intermediate representation; and
program instructions, stored in at least one non-transitory computer readable medium, for materializing a native interface environment pointer and passing the pointer to the actual implementation of the native function call.

18. The data processing system of claim 13, wherein the intermediate representation of the native function is binary code of the native function.

19. A computer program product in a non-transitory computer readable medium for inlining native functions into compiled Java code, the computer program product comprising:
first instructions, stored in the non-transitory computer readable medium, for running a just-in-time compiler by a Java runtime environment to a standard inlining phase;
second instructions, stored in the non-transitory computer readable medium, for detecting, responsive to running the just-in-time compiler to the standard inlining phase, a native function call at a Java callsite;
third instructions, stored in the non-transitory computer readable medium, for determining if the native function call is to an opaque function, wherein the call to the opaque function invokes procedures for which a just-in-time compiler cannot render an intermediate representation;
fourth instructions, stored in the non-transitory computer readable medium, for determining, responsive to determining that the native function call is to an opaque function, whether the Java callsite was created while processing Java bytecodes;
fifth instructions, stored in the non-transitory computer readable medium, for synthesizing, responsive to determining that the Java callsite was not created while processing Java bytecode, a Java callable native function, and replacing the native function call with a call to the synthesized native function, wherein the synthesized native function provides access to a native library containing an implementation of the opaque function;
sixth instructions, stored in the non-transitory computer readable medium, for converting, responsive to determining that the native function call is not an opaque function, an intermediate representation of native function to a just-in-time compiler intermediate representation and omitting inlining of native functions called from opaque functions;
seventh instructions, stored in the non-transitory computer readable medium, for inlining the just-in-time compiler intermediate representation into the native function.

20. The computer program product of claim 19, wherein the second instructions further comprise:
first sub-instructions, stored in the non-transitory computer readable medium, for iterating through the intermediate representation of the native function; and
second sub-instructions, stored in the non-transitory computer readable medium, for generating a just-in-time compiler intermediate representation for each instruction in the intermediate representation of the native function,
wherein the intermediate representation of the native function is retrieved from a native library containing native binary code and the intermediate representation of the native function.

21. The computer program product of claim 19, wherein the seventh instructions further comprise:
a sub-instructions, stored in the computer readable medium, for materializing a native interface environment pointer and passing the pointer to the actual implementation of the native function call.

22. The computer program product of claim 19, wherein the intermediate representation of the native function is binary code of the native function.

23. The computer program product of claim 21, further comprising:
a sub-instructions, stored in the non-transitory computer readable medium, for determining if the native function call represents a call from Java to a native function, if the native function call is to an opaque function.

* * * * *